United States Patent
Chang

(10) Patent No.: US 6,325,315 B1
(45) Date of Patent: Dec. 4, 2001

(54) CHANGE-SPEED CONSTRUCTION FOR FISHING REEL

(75) Inventor: Liang-Jen Chang, No. 23, Lane 184-15, Hsin-Ping Rd., Tai-Ping City, Taichung Hsien (TW)

(73) Assignee: Liang-Jen Chang, Tai-Ping (TW)

( * ) Notice: Subject to any disclaimer, the term of this patent is extended or adjusted under 35 U.S.C. 154(b) by 36 days.

(21) Appl. No.: 09/587,217

(22) Filed: Jun. 1, 2000

(51) Int. Cl.[7] .................................................. A01K 89/00
(52) U.S. Cl. .............................. 242/255; 74/371; 74/372; 74/333; 192/48.91; 192/96
(58) Field of Search ..................................... 242/249, 255, 242/257, 259, 260; 74/333, 369, 371, 372; 192/67 R, 108, 48–91, 96

(56) References Cited

U.S. PATENT DOCUMENTS

| | | | |
|---|---|---|---|
| 4,155,520 | * | 5/1979 | Klotz ..................................... 242/255 |
| 4,867,392 | * | 9/1989 | Sato ...................................... 242/255 |
| 5,058,447 | * | 10/1991 | Ikuta ..................................... 242/255 |
| 5,454,526 | * | 10/1995 | Kaneko ................................. 242/255 |
| 6,102,316 | * | 8/2000 | Nilsen ................................... 242/255 |
| 6,113,019 | * | 9/2000 | Jewell ................................... 242/255 |
| 6,254,020 | * | 7/2001 | Nilsen ................................... 242/255 |

* cited by examiner

Primary Examiner—Emmanuel M. Marcelo
(74) Attorney, Agent, or Firm—Christensen O'Connor Johnson Kindness PLLC

(57) ABSTRACT

A change-speed construction for a fishing rod includes a hollow cylindrical shaft, and a control shaft that is movable within the cylindrical shaft between an outer position and an inner position. A key member is carried on a carrier, which is disposed axially and movably within the cylindrical shaft. A coiled small compression spring has two ends that are fastened respectively to the carrier and the control shaft. Two gears are sleeved rotatably on the cylindrical shaft. The key member is engaged within a keyway unit in one of the gears when the control shaft is located at the outer position, and within a keyway unit in the other one of the gears when the control shaft is located at the inner position. As such, the key member is urged by the small compression spring to move smoothly between the keyway units.

6 Claims, 5 Drawing Sheets

CHANGE-SPEED CONSTRUCTION FOR FISHING REEL

BACKGROUND OF THE INVENTION

1. Field of the Invention

This invention relates to a fishing reel, more particularly to a change-speed construction for a fishing reel.

2. Description of the Related Art

The improvement of this invention is directed to a conventional change-speed construction for a fishing reel disclosed in U.S. Pat. No. 5,058,447, which includes an engaging element that is movable for engaging either first or second gear for transmitting power. However, although a projection is provided on the engaging element, the latter still has a tendency to slant, thereby resulting in an unsmooth gear engaging operation.

SUMMARY OF THE INVENTION

The object of this invention is to provide a change-speed construction for a fishing reel, which can perform a smooth gear engaging operation for speed change.

According to this invention, a change-speed construction for a fishing rod includes a hollow cylindrical shaft, and a control shaft that is movable within the cylindrical shaft between an outer position and an inner position. A key member is carried on a carrier, which is disposed axially and movably within the cylindrical shaft. A coiled small compression spring has two ends that are fastened respectively to the carrier and the control shaft. Two gears are sleeved rotatably on the cylindrical shaft. The key member is engaged within a keyway unit in one of the gears when the control shaft is located at the outer position, and within a keyway unit in the other one of the gears when the control shaft is located at the inner position. As such, the key member is urged by the small compression spring to move smoothly between the keyway units.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
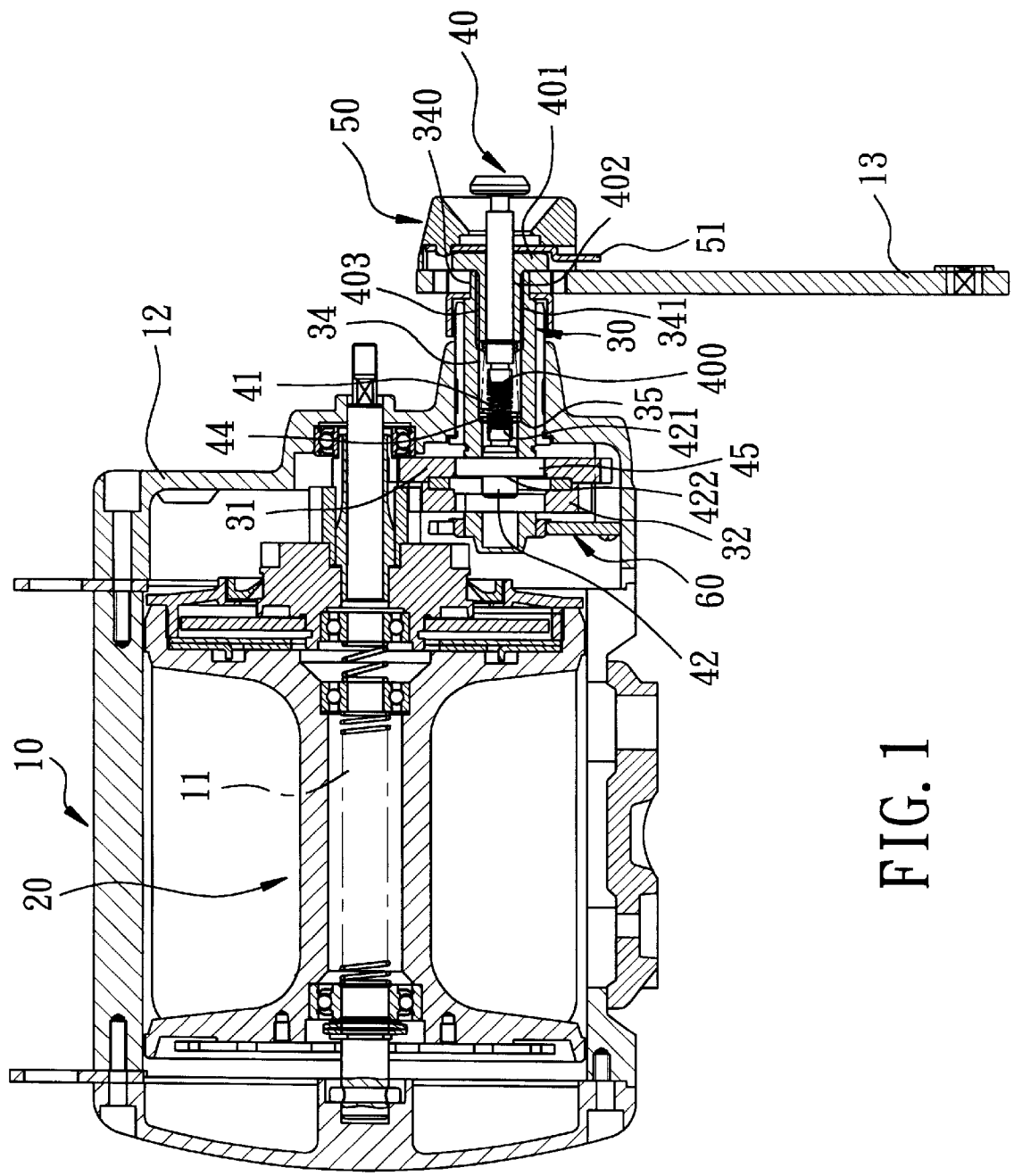
FIG. 1 is a sectional view of the preferred embodiment of a change-speed construction for a fishing reel according to this invention.
Figure 2:
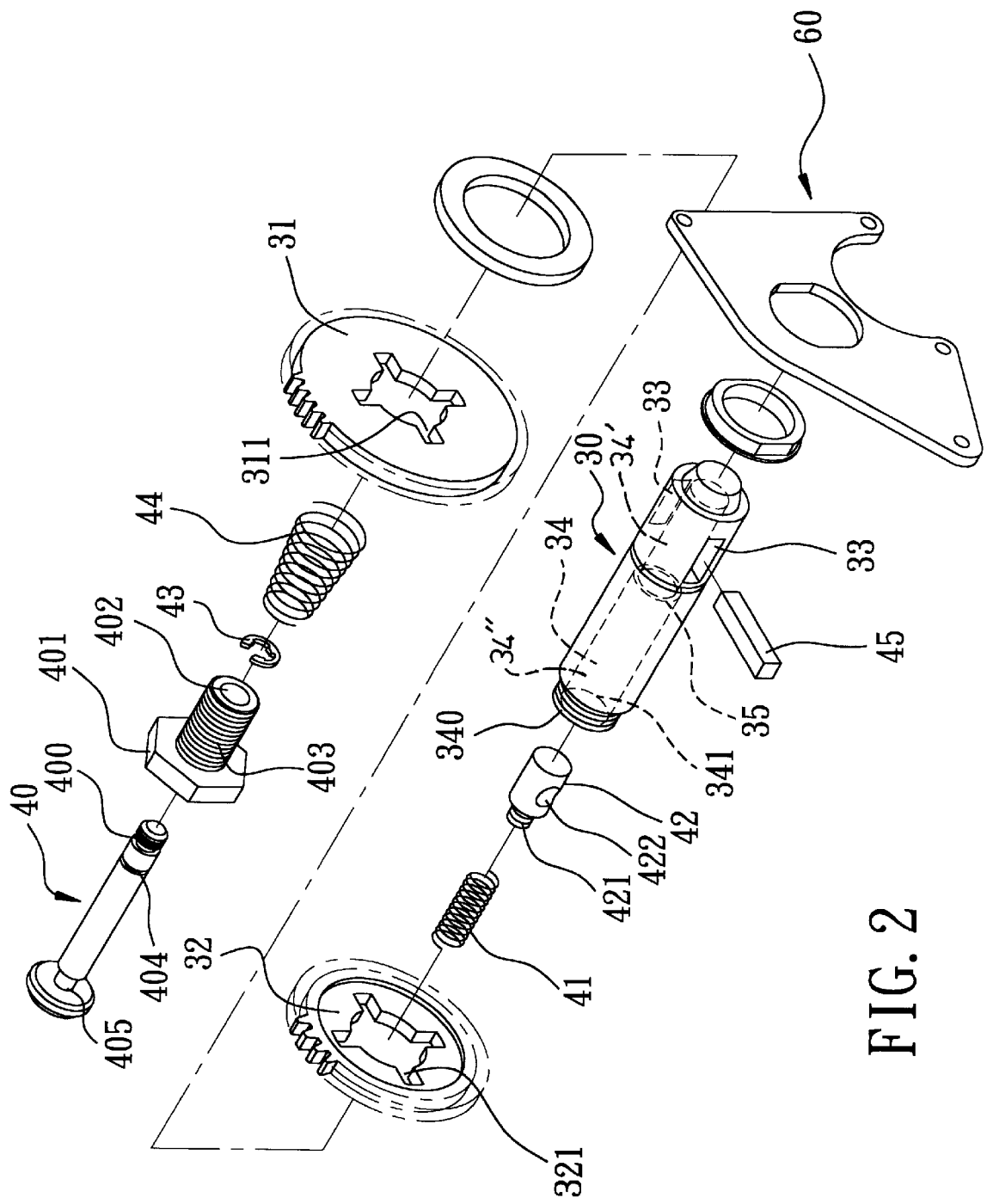
FIG. 2 is an exploded perspective view of a portion of the preferred embodiment.

Referring to FIGS. 1 and 2, the preferred embodiment of a change-speed construction for a fishing reel according to this invention is shown to include a reel body 10, a spool 20, a hollow cylindrical shaft 30, a control shaft 40, a rotary knob 50, and a fixing plate 60.

The spool 20 is sleeved fixedly on a support shaft 11, which is journalled in a right side cover 12 of the reel body 10. A rotary lever 13 is disposed rotatably on the right side cover 12.

The cylindrical shaft 30 is journalled in the reel body 10, and has first and second gears 31, 32 that are sleeved rotatably on the cylindrical shaft 30, and an axially extending slide slot unit, which includes two aligned slide slots 33 that are formed through a wall thereof and that are communicated with a small-diameter bore section 34' (see FIG. 2) of a central bore 34 in an outer end surface of the cylindrical shaft 30. The first and second gears 31, 32 are formed with first and second keyway units 311, 321, respectively. The central bore 34 further has a large-diameter bore section 34", which has a diameter larger than that of the small-diameter bore section 34' to define a shoulder 35 therebetween. The rotary lever 13 is connected fixedly to an outer end of the cylindrical shaft 30. The fixing plate 60 is fixed in the reel body 10 for journalling the cylindrical shaft 30 thereon.

Figure 3:
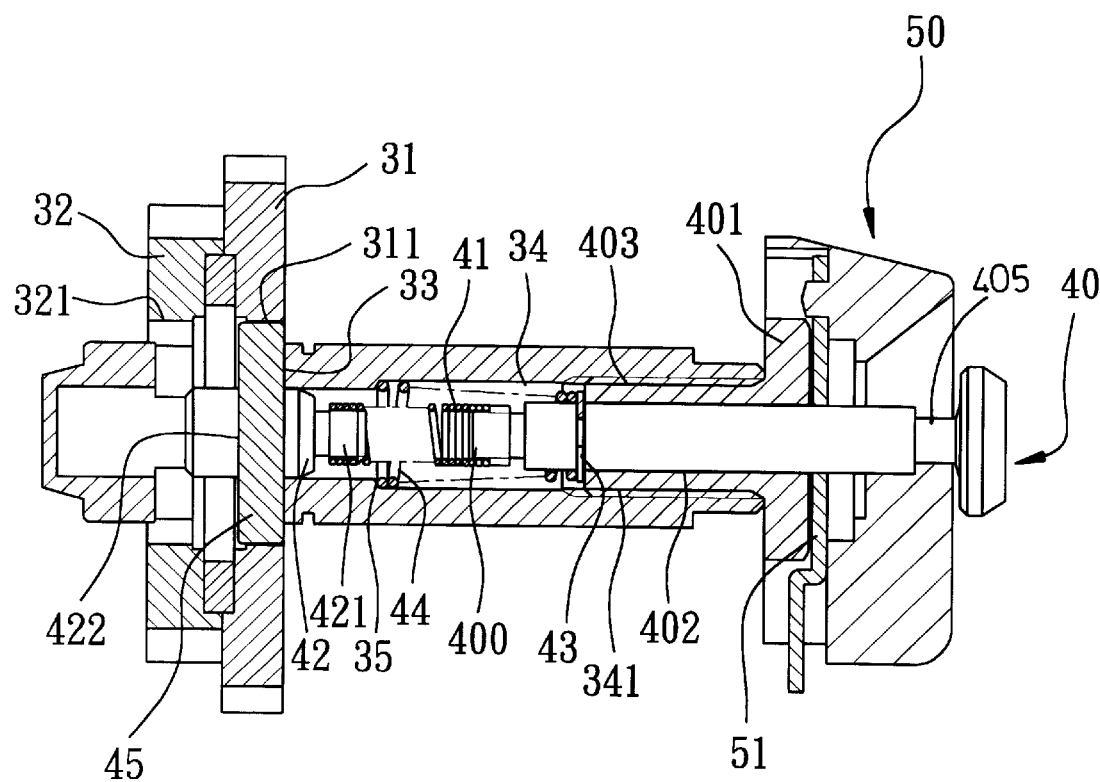
FIG. 3 is a schematic sectional view illustrating how a control shaft of the preferred embodiment is located at an outer position, in which a key member engages a first keyway unit in a first gear.
Figure 4:
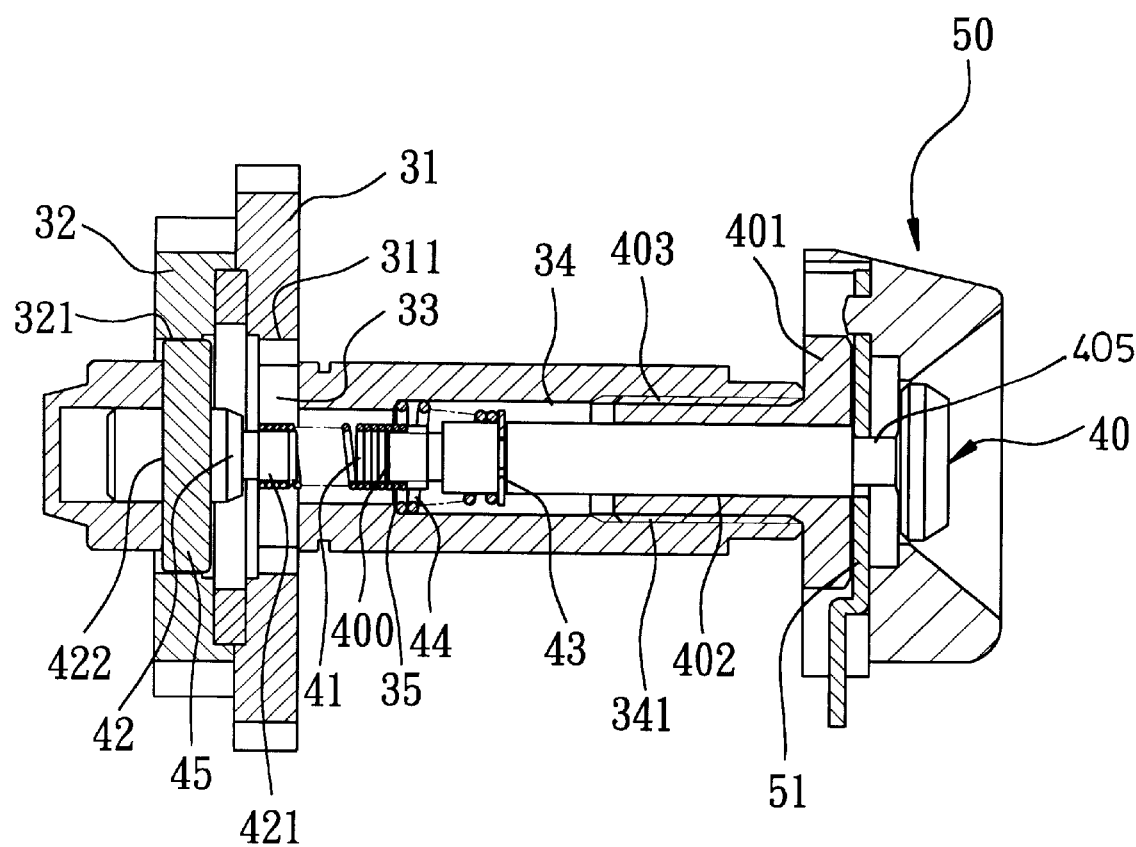
FIG. 4 is a schematic sectional view illustrating how the control shaft of the preferred embodiment is located at an outer position, in which the key member engages a second keyway unit in a second gear.

The control shaft 40 is disposed axially and movably within the outer end of the cylindrical shaft 30, and is movable within the cylindrical shaft 30 between an outer position shown in FIG. 3 and an inner position shown in FIG. 4. The outer end of the cylindrical shaft 30 has an externally threaded portion 340 for engaging threadedly the rotary lever 13, and an internally threaded portion 341.

A hollow headed bolt 401 has an axial hole 402 formed therethrough for extension of the control shaft 40, and an externally threaded portion 403 that engages threadedly the internally threaded portion 341 of the cylindrical shaft 30.

The control shaft 40 has an inner end portion, which is formed with an annular groove 404, within which a C-shaped retaining ring 43 engages. The C-shaped retaining ring 43 is sized so as to be confined within the large-diameter bore section 34" of the central bore 34 in the cylindrical shaft 30. As such, the control shaft 40 is retained on the cylindrical shaft 30.

An elongated carrier 42 is disposed axially and movably within the cylindrical shaft 30, and has an externally threaded outer end portion 421 and a transverse hole 422 for extension of a key member 45 therethrough, which is shaped as a straight rod and which extends through the slide slots 33 in the cylindrical shaft 30.

A coiled small compression spring 41 has two ends that are sleeved respectively on an externally threaded inner end portion 400 of the control shaft 40 and the externally threaded outer end portion 421 of the carrier 42.

A coiled large compression spring 44 is disposed within the large-diameter bore section 34" of the central bore 34 in the cylindrical shaft 30 for biasing the control shaft 40 to the outer position. In this embodiment, the large compression spring 44 is shaped as a truncated cone, which has a small-diameter end that abuts against the C-shaped retaining ring 43, and a large-diameter end, which has a diameter larger than that of the small-diameter end and which abuts against the shoulder 35 of the cylindrical shaft 30.

Referring to FIG. 3, when the control shaft 40 is located at the outer position, the key member 45 engages the first keyway unit 311 in the first gear 31 for transmitting force to the support shaft 11.

Figure 5:
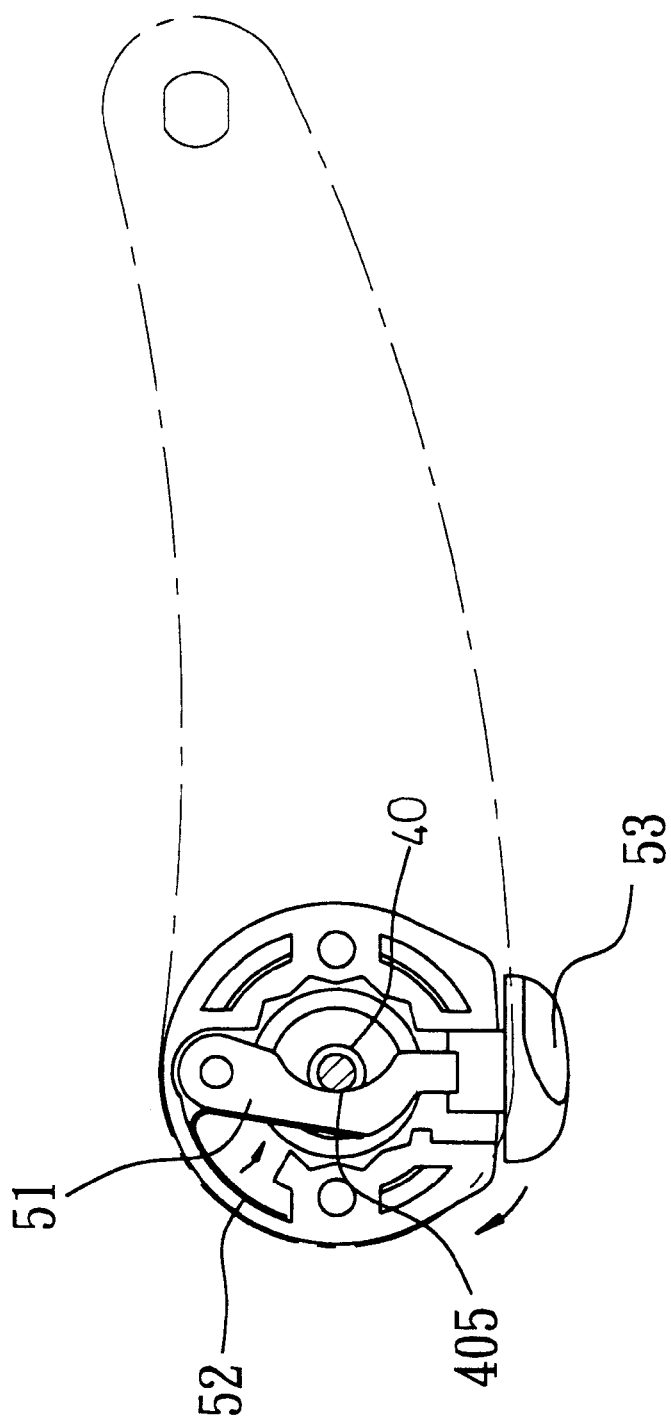
FIG. 5 is a schematic view illustrating how the control shaft of the preferred embodiment is locked at the inner position by means of a pivotable retaining member.

Referring to FIGS. 4 and 5, a pivotable retaining member 51 is biased by a reed spring 52 to press against the control shaft 40. When the control shaft 40 is pushed to the inner position so as to engage the key member 45 with the second keyway unit 321 in the second gear 32, the retaining member 51 engages an annular groove 405 in an outer end portion of the control shaft 40 for locking the control shaft 40 at the inner position. At this time, a push knob 53 of the retaining member 51 can be pushed in a direction indicated by an arrowhead in FIG. 5 to remove the retaining member 51 from the control shaft 40 so that the control shaft 40 is moved to the outer position by the large compression spring 44.

During the gear engaging operation of the key member 45, because the small compression spring 41 is interposed between the carrier 42 and the control shaft 40, the key member 45 can move smoothly between the first and second keyway units 311, 321.

With this invention thus explained, it is apparent that numerous modifications and variations can be made without departing from the scope and spirit of this invention. It is therefore intended that this invention be limited only as indicated in the appended claims.

I claim:

1. A change-speed construction for a fishing reel comprising:

a reel body;

a hollow cylindrical shaft journalled in said reel body and having an outer end, and an axially extending slide slot unit formed therein;

a rotary lever connected fixedly to said outer end of said cylindrical shaft;

a control shaft disposed axially and movably within said outer end of said cylindrical shaft and having an inner end, said control shaft being movable within said cylindrical shaft between an outer position and an inner position;

a first gear sleeved rotatably on said cylindrical shaft and formed with a first keyway unit;

a second gear sleeved rotatably on said cylindrical shaft and formed with a second keyway unit;

a carrier disposed axially and movably within said cylindrical shaft;

a key member attached to said carrier;

a coiled small compression spring disposed between said carrier and said inner end of said control shaft in said cylindrical shaft and having two ends that are fastened respectively to said carrier and said inner end of said control shaft, thereby engaging said key member with one of said first and second keyway units when said control shaft is at said outer position, and with the other one of said first and second keyway units when said control shaft is at said inner position for speed change;

a coiled large compression spring disposed in said cylindrical shaft for biasing said control shaft to said outer position; and means for locking releaseably said control shaft at said inner position.

2. The change-speed construction as claimed in claim 1, wherein said outer end of said cylindrical shaft has an internally threaded portion, said change-speed construction further including a hollow headed bolt, which engages threadedly said internally threaded portion of said cylindrical shaft and which has an axial hole formed therethrough for extension of said control shaft.

3. The change-speed construction as claimed in claim 2, wherein said cylindrical shaft has an outer end surface formed with a central bore, which has a small-diameter bore section and a large-diameter bore section that has a diameter larger than that of said small-diameter bore section to define a shoulder between said large-diameter and small-diameter bore sections, said control shaft having an inner end portion that is formed with an annular groove, said change-speed construction further including a C-shaped retaining ring, which is confined within said large-diameter bore section of said central bore in said cylindrical shaft and which engages said annular groove in said control shaft, thereby retaining said control shaft on said cylindrical shaft.

4. The change-speed construction as claimed in claim 3, wherein said large compression spring is disposed within said large-diameter bore section of said central bore in said cylindrical shaft, and is shaped as a truncated cone, which has a small-diameter end that abuts against said C-shaped retaining ring, and a large-diameter end, which has a diameter larger than that of said small -diameter end and which abuts against said shoulder of said cylindrical shaft.

5. The change-speed construction as claimed in claim 3, wherein said slide slot unit in said cylindrical shaft includes two aligned slide slots that are formed through a wall thereof and that are communicated with said small-diameter bore section of said central bore in said cylindrical shaft, said carrier being elongated and having a transverse hole formed therethrough, said key member being shaped as a straight rod that extends through said hole in said carrier.

6. The change-speed construction as claimed in claim 1, wherein said control shaft has an externally threaded inner end portion, said carrier having an externally threaded outer end portion, said ends of said small compression spring being sleeved respectively on said externally threaded inner end portion of said control shaft and said externally threaded outer end portion of said carrier.

* * * * *